Sept. 25, 1923.   F. W. WALLACE   1,468,682
COASTER
Filed Sept. 14, 1922   2 Sheets-Sheet 1
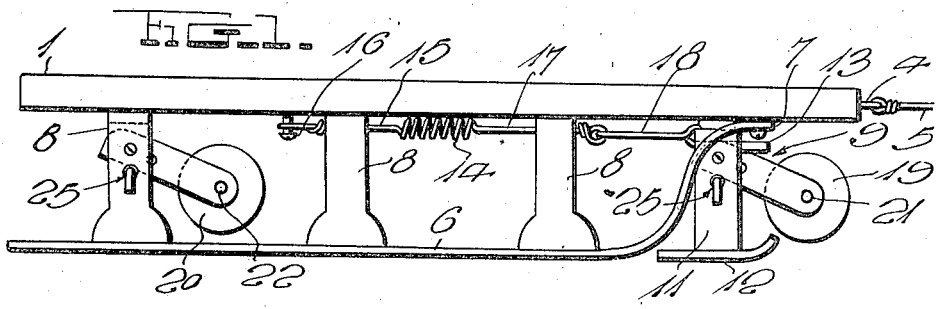
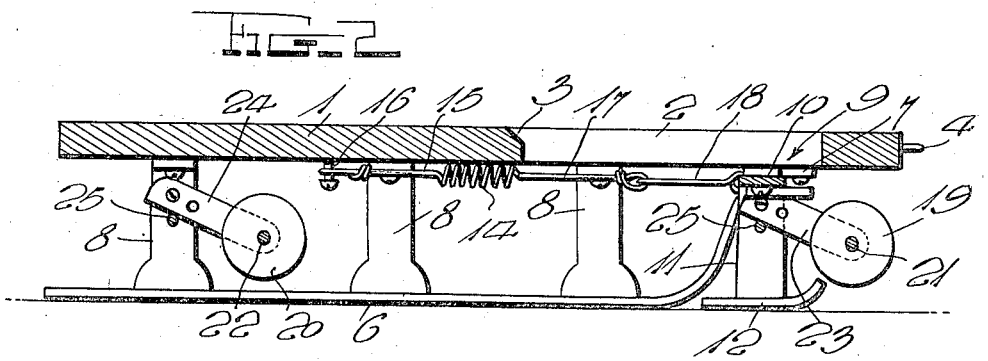
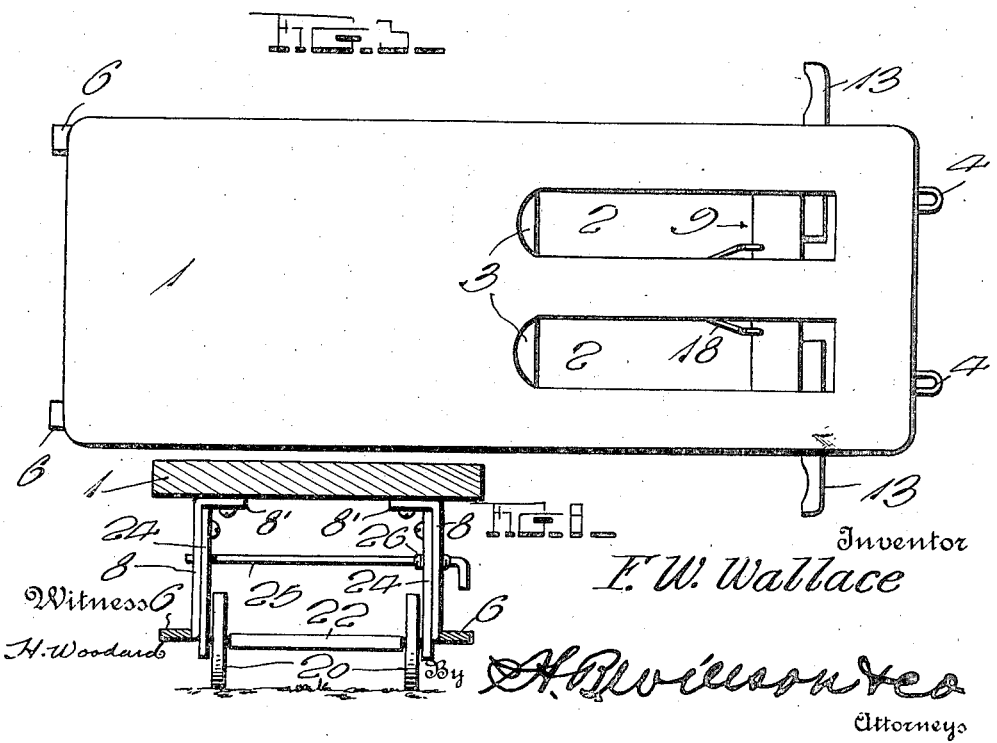
Inventor
F. W. Wallace

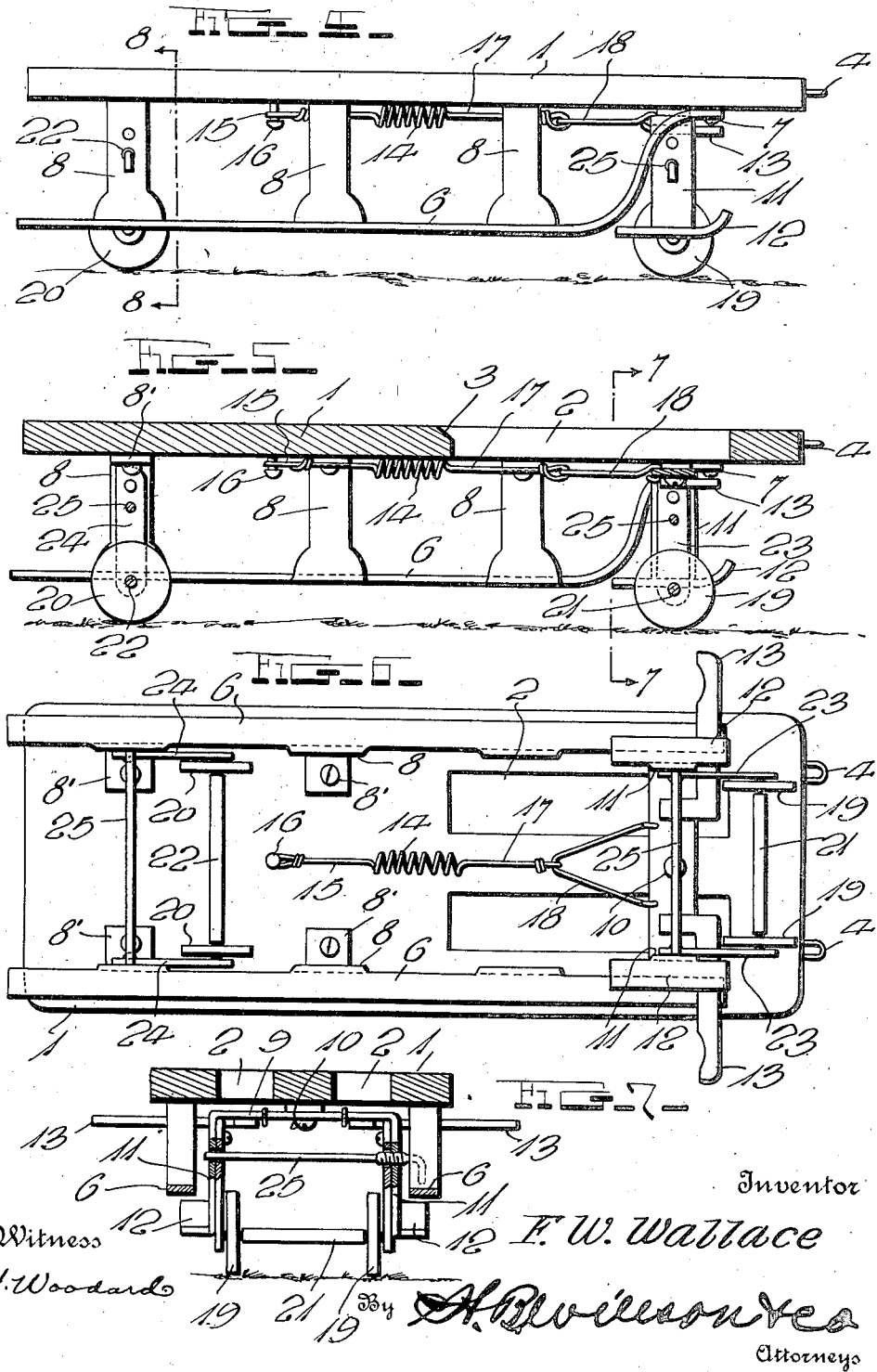

Patented Sept. 25, 1923.

1,468,682

UNITED STATES PATENT OFFICE.

FRANK W. WALLACE, OF CHATTANOOGA, TENNESSEE.

COASTER.

Application filed September 14, 1922. Serial No. 588,204.

*To all whom it may concern:*

Be it known that I, FRANK W. WALLACE, a citizen of the United States, residing at Chattanooga, in the county of Hamilton and State of Tennessee, have invented certain new and useful Improvements in Coasters; and I do declare the following to be a full, clear, and exact description of the invention, such as will enable others skilled in the art to which it appertains to make and use the same.

This invention relates to a coaster for use upon snow and ice or upon pavements and one object of the invention is to provide a coaster having sled runners and also provided with wheels mounted by means of standards pivotally connected with the standards of the runners and movable into and out of an operative position.

Another object of the invention is to so construct this coaster that pins which serve to retain the wheel carrying standards in an operative position may also be used to retain the wheel carrying standards in an inoperative position.

Another object of the invention is to provide the coaster with an improved type of front truck pivotally mounted for steering and having improved means for yieldably retaining the front truck in a position to direct the coaster straight ahead but permit the truck to be turned to properly guide the coaster.

This invention is illustrated in the accompanying drawings, wherein:

Figure 1 is a view showing the coaster in side elevation with the wheels in an inoperative position.

Figure 2 is a longitudinal sectional view through the coaster with the wheels in the inoperative position.

Figure 3 is a top plan view of the coaster.

Figure 4 is a side elevation of the coaster showing the wheels in the operative position.

Figure 5 is a longitudinal sectional view through the coaster with the wheels in the operative position.

Figure 6 is a bottom plan view of the coaster with the wheels in the inoperative position.

Figure 7 is a transverse sectional view taken along the line 7—7 of Fig. 5.

Figure 8 is a transverse sectional view taken along the line 8—8 of Fig. 4.

This improved coaster is provided with a platform 1 which in the present illustration is formed from a single piece of material. This platform is provided in its forward end portion with longitudinally extending slots 2 so that if desired the feet may be passed through these slots in order to permit access to the front truck which will be turned when it is desired to guide the coaster. At their rear ends, the slots are provided with inclined portions 3 so that when the legs are passed through the slots to reach the front truck and steer the coaster, the inclined portions 3 will prevent cutting. At its forward end, the platform has been provided with eyes 4 so that a rope 5 can be connected with the forward end portion of the platform.

The sled runners 6 extend longitudinally beneath the platform and have their forward end portions curved upwardly and secured to the underface of the platform as shown at 7. Standards 8 extend upwardly from the runners and are secured against the underface of the platform by means of fasteners which pass through the side extensions 8'. It will thus be seen that these runners will be very firmly held in place. A front truck 9 has been provided for the coaster and is pivotally mounted beneath the platform by means of a pivot fastener 10. This front truck is U-shaped and has its depending arms 11 provided with runner feet 12. It will thus be seen that the front truck may rest upon the snow or ice and that when the front truck is turned, the coaster may be guided. From an inspection of Figs. 1 and 2, it will be readily seen that these runners 12 are level with the runners 6 so that the coaster will rest level when placed upon the snow or ice. The cross head portion of this front truck extends beneath the slots 2 so that when so desired the feet may be passed through the slots and placed against the cross head at opposite sides of the pivot mounting. In some cases, it is not desired to pass the feet through the slots 2 and therefore there has been provided stirrup bars 13 which are secured to the cross head of the front truck and extend beyond the sides of the platform. When the coaster is being used, it is desired to have the front truck normally remain in the position to direct the coaster straight ahead thus making it easier to guide when going down hill and further permitting the coaster to be easily drawn along the ground by means of the rope 5.

Therefore, there has been provided a spring 14 which extends longitudinally of the platform and is provided at one end with a stem extension 15 secured to an anchor pin 16. At the other or forward end, the spring has been provided with a second arm or stem extension 17 connected with a yoke 18 which extends forwardly and has its arms connected with the cross head of the front truck upon opposite sides of the pivot mounting. The spring 14 will therefore serve to normally retain the truck in the position shown in Fig. 6, but will permit of its being turned in either direction by pressure against the cross head of the truck or against the proper stirrup bar.

This coaster is to be used when there is snow or ice upon the ground and also when there is no snow or ice. In order to permit the coaster to be used when there is no snow or ice, there has been provided front and rear wheels 19 and 20. These wheels are mounted upon axles 21 and 22 which are carried by standards 23 and 24. The standards 23 are pivotally connected with the arms 11 of the front truck so that they may be swung vertically into and out of an operative position and the standards 24 are pivotally connected with the rear standard 8 of the runner 6. From an inspection of Fig. 2, it will be readily seen that at their upper ends, the standards have been rounded off so that the standards may be swung upwardly to the position shown in this figure. When the standards are swung downwardly to the position shown in Fig. 5, the upper ends of the standards will engage and prevent the standards from being moved rearwardly beyond the vertical position. In order to permit the standards to be secured in either the operative position shown in Fig. 5 or the inoperative position shown in Fig. 2, there has been provided securing pins 25 which may be plain pins held in place by friction or may be constructed as shown in Fig. 7 and provided with a threaded portion 26. These pins are passed through alined openings formed in the arms of the front truck and rear standards of the runners 6. When the standards are in the inoperative position shown in Fig. 2, the pins extend beneath the standards, but when the standards are swung downwardly to the operative position, the pins will be passed through openings which are formed in the standards and register with the openings in the standards 8 and arms 11. The wheel carrying standards can therefore be very securely held in an operative position but may be easily released and after being swung upwardly to an inoperative position prevented from accidentally swinging downwardly into engagement with the ground.

I claim:

1. A coaster comprising a platform, ground engaging runners extending beneath the platform, and a truck element pivotally mounted beneath the platform adjacent the forward ends of said runners and having depending arms terminating in runner feet, the platform being provided with longitudinally extending slots having their forward end portions extending beyond said truck and permitting access to said truck for steering with the feet.

2. The structure of claim 1 having the truck provided with stirrup bars extending beyond the sides of the platform.

In testimony whereof I have hereunto affixed my signature.

FRANK W. WALLACE.